Oct. 12, 1954   R. T. OLIVER   2,691,444
CHAFFER SCREEN LEVELING DEVICE FOR COMBINES
Filed Oct. 29, 1952   2 Sheets-Sheet 1
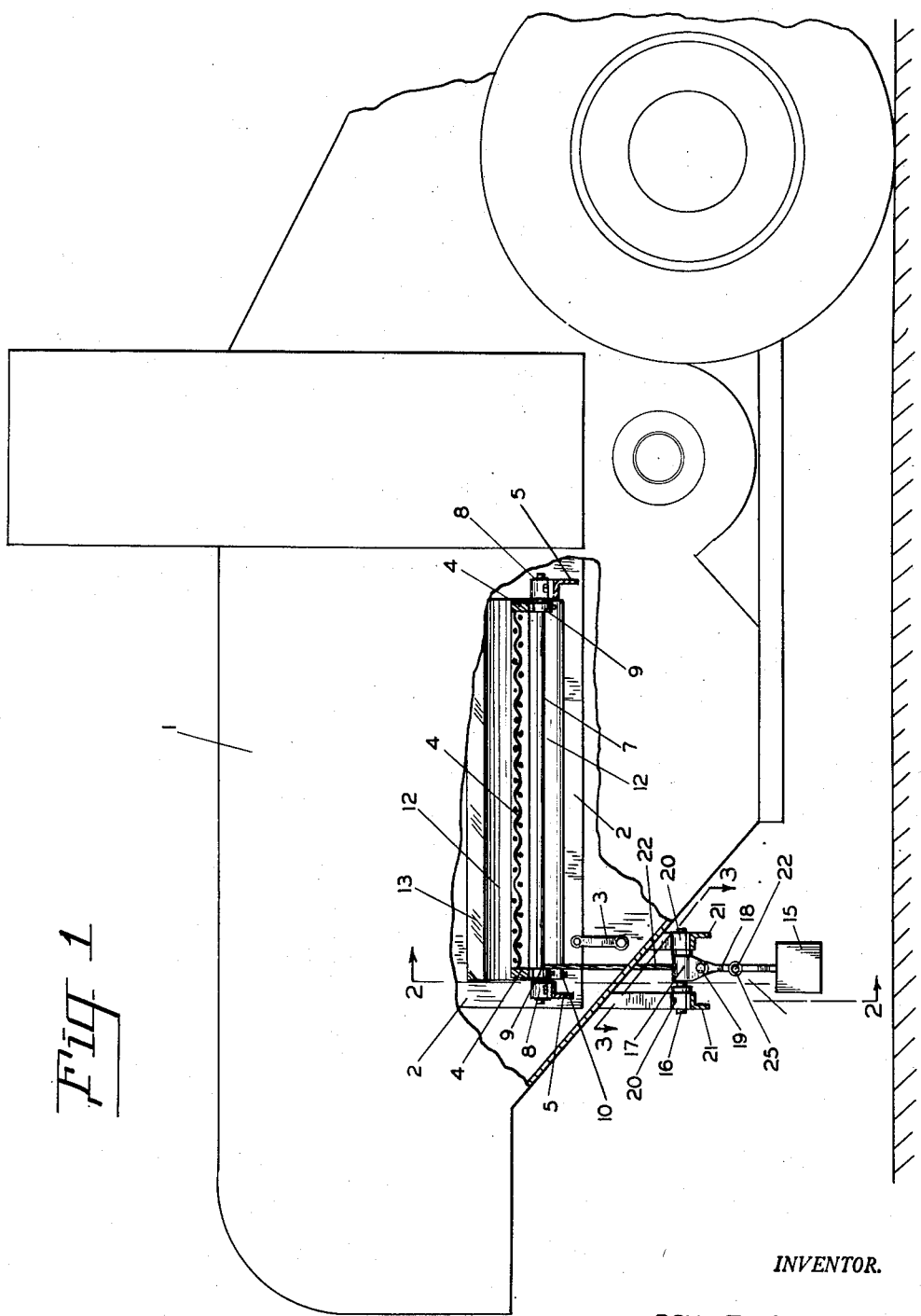
INVENTOR.
ROY T. OLIVER
BY
ATTORNEY Oct. 12, 1954  R. T. OLIVER  2,691,444
CHAFFER SCREEN LEVELING DEVICE FOR COMBINES
Filed Oct. 29, 1952  2 Sheets-Sheet 2
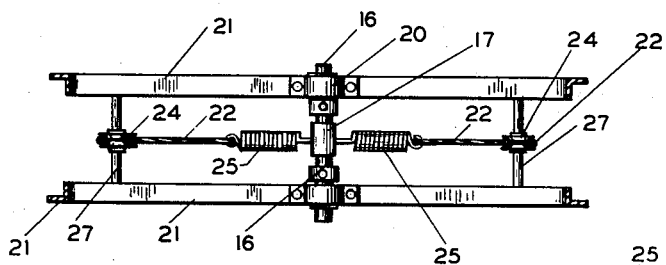
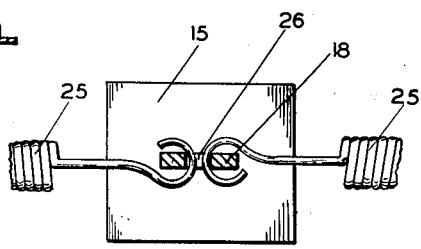
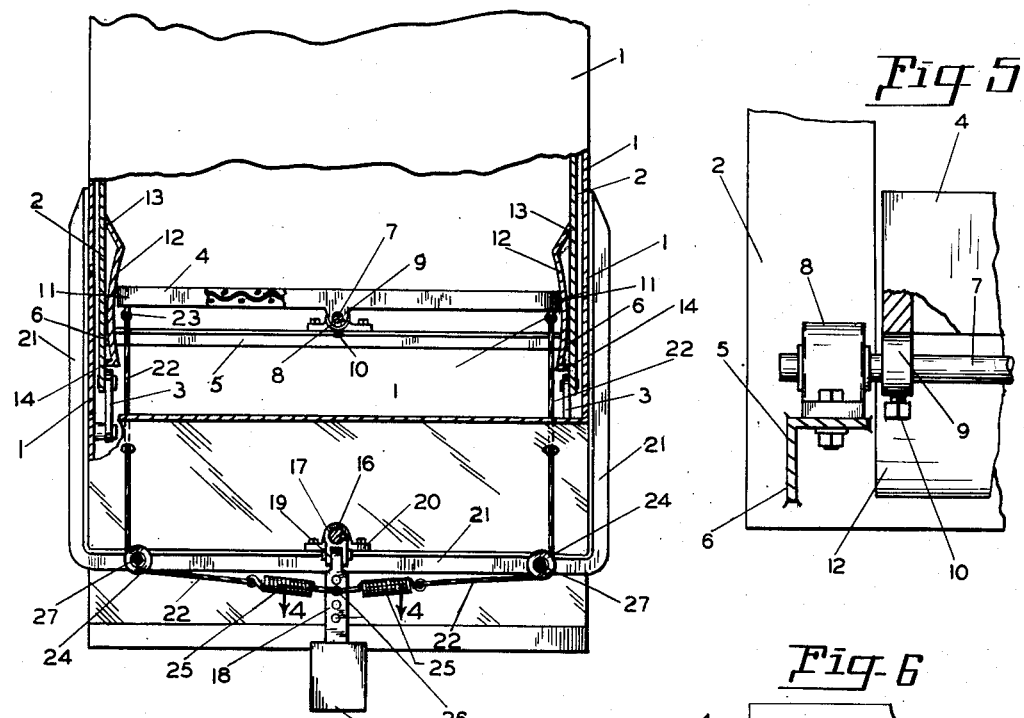
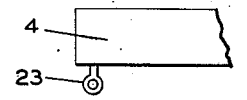
INVENTOR.
ROY T. OLIVER
BY [signature]
ATTORNEY Patented Oct. 12, 1954

2,691,444

UNITED STATES PATENT OFFICE 2,691,444

CHAFFER SCREEN LEVELING DEVICE FOR COMBINES

Roy T. Oliver, Portland, Oreg.

Application October 29, 1952, Serial No. 317,545

4 Claims. (Cl. 209—416)

This invention relates to levelling devices for chaffer screens and is particularly adapted to be used in combines operating on hillsides.

The primary object of the invention is to provide a levelling device wherein gravity maintains the chaffer screen in a level condition on hillside combining at all times.

In present day combines, one of the difficulties is that the chaff and grain pile up on one side of the chaffer screen, due to the fact that the combine is caused to lean towards one side due to hillside operation, but with this new and improved levelling device, the chaffer screen is kept on a level plane, thereby completely separating the grain from the chaff even though the combine is not level.

With my new and improved levelling device, the chaffer screen is pivotally mounted longitudinally of the combine. The screen being maintained in a transverse level condition regardless of the unevenness of the ground surface.

In maintaining this level, a weight is pivotally mounted to the combine in such a manner as to maintain the chaffer screen level by the use of cables connecting the said screens to the weight. By the use of cables for interconnecting the screen with the weight, minor movements or vibrations are absorbed within the cable system, eliminating undesirable oscillations of the screen.

These and other incidental objects will be apparent in the drawings, specification and claims.

Referring to the drawings:

Figure 1 is a side view of a combine, partially broken away for illustrating my new and improved levelling device associated with the chaffer screen.

Figure 2 is an enlarged fragmentary sectional view, taken on line 2—2 of Figure 1, illustrating my new and improved levelling device.

Figure 3 is a fragmentary plan view of the levelling device, taken on line 3—3 of Figure 1.

Figure 4 is an enlarged plan view of the weight for controlling the device, taken on line 4—4 of Figure 2.

Figure 5 is an enlarged fragmentary detail view illustrating how the chaffer screen is mounted to the shaker shoe within the combine.

Figure 6 is a fragmentary enlarged view of one corner of the screen, illustrating a special fitting to which the cables are attached.

Referring more specifically to the drawings:

A conventional type of combine is illustrated by numeral 1. The usual shaker shoe is illustrated by numeral 2 and supported within the combine body by the usual rocker arm 3. This shoe operates forward and backward within the combine and is operated by the usual mechanism not here shown. Ordinarily the chaffer screen of the combine is fixedly secured within this shoe by various mechanical methods, but my invention consists of mounting the chaffer screen 4 within the shoe by the following method.

Transverse bars 5 are fixedly connected to the sides of the shoe at 6 by any suitable means, as for instance welding, or they may be bolted thereto. There are two of these transverse bars, one forward of the screen and one aft of the screen.

The chaffer screen is mounted to a shaft 7 running longitudinally of the combine and journalled within the bearings 8, which are mounted upon the transverse bars 5, as best illustrated in Figures 1, 2 and 5. The screen 4 is secured to the shaft 7 by the hangers 9, which have set screws 10 for locking the same to the shaft.

The sides or edges 11 of the screen operate within the shields 12. The object of these shields is to prevent the grain from getting by the edge of the screen when the said screen operates within its entire range of operation. The upper edges of the shields are brought towards the shoe 2 at 13 and secured thereto, as best illustrated in Figure 2, and affixed to the shoe at 14 along its lower edge by any suitable means, as for instance welding.

In order to maintain the screen on a level plane, I have mounted a weight 15 to the shaft 16 by way of the special bifurcated member 17, which is keyed to the said shaft 16. The weight itself being supported by the lever arm 18, which in turn is pivotally connected to the member 17 by the cross pin 19, permitting a fore and aft movement of the weight while going up or down hill. The shaft 16 is journalled within bearings 20, which are mounted to the U-shaped hangers 21. These hangers are secured to the combine by any suitable means, as by welding or bolting.

Cables 22 are fixedly secured to each edge of the screen 4 by way of the I-bolts 23 at their one end, and are trained about the idler pulleys 24 and connected to the hanger lever 18 by way of the springs 25. The springs being hooked into the desired opening 26 formed in the lever 18, as best illustrated in Figures 2 and 4. The pulleys 24 are journalled to the cross shafts 27, as best illustrated in Figure 3.

In the operation of my new and improved levelling device for chaffer screens, when the combine is level the screen is in the position as illustrated in the drawings, but in the event the combine should lean to one side due to a hillside surface, the lever arm 18 would be maintained in a vertical position by the weight 15, and the chaffer screen would be maintained level by the cables 22. The screen 4 being maintained in level condition due to the position of the weight 15 in regards to the vertical center line of the combine.

The object of providing the spring units 25 is to absorb ordinary undesirable movements or shocks. These springs absorb shocks that would ordinarily impart a severe jerking movement to the cables and to the screen 4, as for instance the forward and backward movement of the shoe.

I do not wish to have the gravity weight confused with a pendulum action. The weight remains stationary regarding a vertical axis holding the chaffer screen stationary in regards to a horizontal action through cable connections. The only movement being the movement of the combine on either side of its vertical axis while travelling over uneven ground. If the weight were considered a pendulum action, the weight would be moving from side to side on a vertical axis, but as stated above the weight remains stationary depending on gravity for holding the same in this vertical stationary position.

What is claimed is:

1. In a combine, the combination with a shaker shoe of a chaffer screen pivotally mounted within said shoe on pivot means centrally of said screen and disposed on an axis extending longitudinally of the direction of combine movement, arcuate shields on each side of said shoe and closely positioned to the edges of said screen, said shields having a curvature substantially on a radius of the pivotal axis of said screen, a weight controlled by gravity, said gravity weight means including a shaft mounted on the combine parallel to and in a vertical plane with said screen pivot means, a hanger pivotally suspended from said shaft, a weight on said hanger, and means connecting said hanger with said screen for holding said screen level regardless of the transverse vertical axis of the combine.

2. In a combine as defined in claim 1, said hanger and screen connecting means comprising a pair of guide pulleys disposed on opposite sides of said hanger, and flexible connections between said hanger and the opposite side portions of said screen and trained around said pulleys, said flexible connections being resilient to dampen vibrations and permit limited free movement of the weight.

3. In a combine as defined in claim 2, said hanger comprising a part pivoted on said shaft and a part fixed to said weight, and a pivotal connection between said parts to permit swinging of the weight longitudinally of combine movement.

4. In a combine as defined in claim 3, said hanger having at least one aperture and said flexible connections comprising cables secured to said screen and trained around said pulleys, and coil springs on the ends of said cables and hooked on said hanger aperture.

References Cited in the file of this patent

UNITED STATES PATENTS

| Number | Name | Date |
|---|---|---|
| 509,082 | Heald | Nov. 21, 1803 |
| 1,058,016 | Renfro | Apr. 1, 1913 |
| 1,122,803 | Rhodes | Dec. 29, 1914 |
| 2,587,918 | Stout | Mar. 4, 1952 |